United States Patent [19]

Thayer et al.

[11] Patent Number: 5,381,530
[45] Date of Patent: Jan. 10, 1995

[54] PROGRAMMABLE LOGIC SYSTEM FOR FILTERING COMMANDS TO A MICROPROCESSOR

[75] Inventors: John S. Thayer; Montgomery C. McGraw, both of Spring, Tex.

[73] Assignee: Compaq Computer Corporation, Houston, Tex.

[21] Appl. No.: 84,632

[22] Filed: Jun. 30, 1993

Related U.S. Application Data

[63] Continuation of Ser. No. 88,093, Aug. 21, 1987, Pat. No. 5,226,122.

[51] Int. Cl.6 .............................................. G06F 1/24
[52] U.S. Cl. .................................. 395/275; 364/926.9; 364/926.93; 364/947.5; 364/DIG. 2; 395/800
[58] Field of Search ................. 395/275, 800; 371/16.3

[56] References Cited

U.S. PATENT DOCUMENTS

| | | | |
|---|---|---|---|
| 3,970,989 | 7/1976 | Ophir | 371/49.1 |
| 4,037,212 | 7/1977 | Nomiya | 364/200 |
| 4,050,098 | 9/1977 | Seipp | 364/900 |
| 4,367,524 | 1/1983 | Budde | 364/200 |
| 4,402,043 | 8/1983 | Guttag | 364/200 |
| 4,434,461 | 2/1984 | Puhl | 364/200 |
| 4,438,492 | 3/1984 | Harmon | 395/375 |
| 4,459,662 | 7/1984 | Skelton et al. | 364/200 |
| 4,488,230 | 12/1984 | Harrison | 364/200 |
| 4,493,034 | 1/1985 | Angelle et al. | 364/200 |
| 4,519,033 | 5/1985 | Vaughn et al. | 364/900 |
| 4,556,938 | 12/1985 | Parker | 364/200 |
| 4,562,538 | 12/1985 | Berenbaum | 395/575 |
| 4,598,356 | 7/1986 | Dean | 364/200 |
| 4,613,936 | 9/1986 | Andresen | 364/200 |
| 4,617,479 | 10/1986 | Hartmann et al. | 364/900 |
| 4,695,945 | 9/1987 | Irwin | 395/275 |
| 4,710,869 | 12/1987 | Enokitono | 364/200 |
| 4,736,290 | 4/1988 | McCallion | 364/200 |
| 4,745,574 | 5/1988 | Aaron | 364/900 |
| 4,747,040 | 5/1988 | Blanset et al. | 364/200 |
| 4,749,991 | 6/1988 | Davis | 364/709.01 |
| 4,779,187 | 10/1986 | Letwin | 364/200 |
| 4,787,032 | 11/1988 | Culley | 364/200 |
| 4,812,975 | 3/1989 | Adachi | 364/200 |
| 4,849,875 | 7/1989 | Fairman | 364/200 |
| 4,860,252 | 8/1989 | Sykora | 364/900 |
| 4,868,822 | 9/1989 | Scott | 364/200 |
| 4,875,186 | 10/1989 | Blume | 364/900 |
| 4,926,322 | 5/1990 | Stimac | 364/200 |
| 4,928,237 | 5/1990 | Bealkowski | 364/200 |
| 5,018,062 | 5/1991 | Culler | 364/200 |

*Primary Examiner*—Eric Coleman
*Attorney, Agent, or Firm*—Vinson & Elkins

[57] ABSTRACT

A system utilizes one or more programmable logic arrays or gate arrays for regulating the commands available to a microprocessor, and intercepting certain of those commands according to predetermined criteria. The system selects and processes designated commands relating to the FORCE-A20 signal and CPU-RESET signal for a keyboard controller functionally attached to an INTEL 80286 or 80386 microprocessor. The system includes one or more programmable logic arrays or gate arrays for allowing all input commands to pass directly through to the keyboard controller except the command sequence relating to the FORCE-A20 signal or the CPU-RESET signal.

29 Claims, 13 Drawing Sheets

```
START
DO
   DO
      wait
   UNTIL (write to command input port or data input port is detected)
   ENDDO
   IF (write was to data port)  THEN
      call routine to send the data in the data input port to keyboard
   ELSE
      Parse_command:
      IF (data in command port equals D1h)  THEN
         DO
            wait
         UNTIL  (write to command input port or data input port is
               detected)
         ENDDO
         IF  (write was to data input port)  THEN
            copy contents of data input port to output port P2
         ELSE
            GOTO Parse_command:
         ENDIF ELSE IF (value in command input port equals FXh
               [X = Don't care bits]}  THEN
         save contents of output port P2 in variable Oldoutreg
         logically AND the contents of output register P2 with the value
            in the input command port, and copy the result to the output
            register P2
         wait 5 microseconds
         copy the value of Oldoutreg to output port P2
      ELSE
         process other commands not related to FORCE-A20 or CPU- RESET
      ENDIF
   ENDIF
REPEAT (forever)
   ENDDO
```

CLK /RST/ CS A2/WC D5 D0 D1 D2 D3 D4 GND
/OC D7 /FF_FE_D1 A20 /Q3 /Q2 /Q1 /Q0 /HLFCLK /WC8042 D6 VCC

Q0 := /RST * WC * CS     ;Q0 FOLLOWS WC, CLEARED ON RESET

Q1 := Q1 * Q3                    ;SET TO ZERO IF STATE 0110
    + Q1 */Q2
    + Q1 * Q0
    + /Q3 * /Q2 * /Q1 * /Q0      ;SET TO ONE IF STATE 0000
    + RST                        ;SET TO ONE ON RESET

Q2 :=     ;SET IF STATE 0011 and A2 and <D1>
      /RST * /Q3 * /Q2 * Q1 * Q0 *A2*D7*D6*/D5*D4*/D3*/D2*/D1*D0
          ;KEEP SET IF STATE = 0110 OR 0111
    + /RST * /Q3 * Q2 * Q1
          ;KEEP SET IF STATE = 0100 OR 1100
    + /RST *       Q2 * /Q1 * /Q0
          ;KEEP SET IF STATE = 1101
    + /RST * Q3 * Q2 * /Q1 * Q0
          ;CLEAR IF STATE 0101 AND NOT (A2 AND <D1>)
              (STAY ONLY IF ANOTHER ;D1 WRITE TO 64H)

Q3 :=     ;SET IF STATE 0011 AND NOT (A2 AND <D1>)
                  ;SET IF STATE 0011 AND (NOT A2)
      /RST * /Q3 * /Q2 * Q1 * Q0 * /A2
                  ;SET IF STATE 0011 AND NOT <D1>
    + /RST * /Q3 * /Q2 * Q1 * Q0 * /FF_FE_D1
    + /RST * /Q3 * /Q2 * Q1 * Q0 * D7*D6*D5*D4*D3*D2*D1*D0
    + /RST * /Q3 * /Q2 * Q1 * Q0 * D7*D6*D5*D4*D3*D2*D1*/D0
          ;SET IF STATE 1011
    + /RST * Q3 * /Q2 * Q1 * Q0
          ;SET IF STATE 0101 AND A2 and <D1>
    + /RST * /Q3 * Q2 * /Q1 * Q0*A2*D7*D6*/D5*D4*/D3*/D2*/D1*D0
          ;SET IF STATE 1101
    + /RST * Q3 * Q2 * /Q1 * Q0

/A20 :=   ;INVERSE OF A20 FUNCTION
          ;CLEAR IF STATE 0101 AND 60 WRITE AND D1 IS LOW
          /RST * /Q3 * Q2 * /Q1 * Q0 * /A2 * /D1
          ;OTHERWISE FEED BACK
    + /RST * Q3 * /A20
    + /RST * /Q2 * /A20
    + /RST * Q1 * /A20
    + /RST * /Q0 * /A20
    + /RST * A2 * /A20

FROM FIG. 7A

HLFCLK  :=     ;HALF CLOCK SPEED OUTPUT FOR RESET PAL TIMER
        /HLFCLK

FF_FE_D1 = D7*D6* D5*D4* D3* D2* D1*D0

+ D7*D6*/D5*D4*/D3*/D2*/D1*D0
+ D7*D6* D5*D4* D3* D2* D1*/D0

WC8042 =  ;NO D1 WRITE YET:
            ;DON'T FILTER IF WRITE IS TO 60H
        Q0 * CS * WC * Q1 * /A2
            ;DON'T FILTER IF WRITE IS TO 64H AND NOT <D1>,<FE> OR <FF>
      + Q0 * CS * WC * Q1 * /FF_FE_D1
            ;DON'T FILTER IF WRITE IS TO 64H AND IS <FE>
      + Q0 * CS * WC * Q1 * /D0
   ;AFTER D1 WRITE
            ;DON'T FILTER IF WRITE IS TO 64 H AND NOT <D1>,<FE> OR <FF>
      + Q0 * CS * WC * /Q1 * A2 * /FF_FE_D1
            ;DON'T FILTER IF WRITE IS TO 64 H AND IS <FE>
      + Q0 * CS * WC * /Q1 * A2 * /D0

FIG. 8A

```
 /OC CLK R/ST CS WC  A2  D7  D6  D5  D4  D3  D2  D1  D0
 Q3  Q2  Q1  Q0  FF_FE_D1  A20  WC8043  HLFCLK

;                                           F       W  H
;                                           F       C  L
;                                           0       8  F
;     C   R                                 R   A   0  C
; O   L   S   C   W   A   D D D D D D D D   Q Q Q Q D  2  4  L
; 0   L   S   C   W   A   D D D D D D D D   Q Q Q Q D  2  4  L
; C   K   T   S   C   2   7 6 5 4 3 2 1 0   3 2 1 0 1  0  2  K
------------------------------------------------------------
  L   X   X   X   X   X   H H H H H H H H   X X X X H  X  X  X  ;TEST FF_OR_D1
  L   X   X   X   X   X   H H L H L L L H   X X X X H  X  X  X
  L   X   X   X   X   X   L L H H L L L H   X X X X L  X  X  X
;
  L   C   H   X   X   X   X X X X X X X X   L L H L X  H  L  X  ;RESET
;
  L   C   L   H   L   X   X X X X X X X X   L L H L X  H  L  X  ;64 WRITE NOT (D1 OR FF)
  L   C   L   H   H   H   L L L L L L L L   L L H H L  H  H  X
  L   C   L   H   H   H   L L L L L L L L   H L H H L  H  H  X
  L   C   L   H   L   H   L L L L L L L L   H L H H L  H  H  X
  L   C   L   H   L   H   L L L L L L L L   H L H L L  H  L  X
  L   C   L   X   L   X   X X X X X X X X   L L H L X  H  L  X
;
  L   C   L   H   L   X   X X X X X X X X   L L H L X  H  L  X  ;64 WRITE FF
  L   C   L   H   H   H   H H H H H H H H   L L H H H  H  L  X
  L   C   L   H   H   H   H H H H H H H H   H L H H H  H  L  X
  L   C   L   H   H   H   H H H H H H H H   H L H H H  H  L  X
  L   C   L   H   L   H   H H H H H H H H   H L H L H  H  L  X
  L   C   L   X   L   X   X X X X X X X X   L L H L X  H  L  X
;
  L   C   L   H   L   X   X X X X X X X X   L L H L X  H  L  X  ;60 WRITE
  L   C   L   H   H   L   X X X X X X X X   L L H X H  H  X  X
  L   C   L   H   H   L   X X X X X X X X   H L H H X  H  X  X
  L   C   L   H   H   L   X X X X X X X X   H L H H X  H  X  X
  L   C   L   H   L   L   X X X X X X X X   H L H L X  H  L  X
  L   C   L   X   L   X   X X X X X X X X   L L H L X  H  L  X
;
  L   C   H   X   X   X   X X X X X X X X   L L H L X  H  L  X  ;RESET
;
  L   C   L   H   L   X   X X X X X X X X   L L H L X  H  L  X  ;CLEAR A20
  L   C   L   H   H   H   H H H L H L L H   L L H H H  H  L  X     ;64 WRITE D1
  L   C   L   H   H   H   H H H L H L L H   L H H H H  H  L  X

FROM FIG. 8A

```
L C L H L X X X X X X X X    L H L L X H L X  ;60 WRITE TO CLEAR
L C L H H X X X X X X X L X  L H L H X H L X     ;LATCH
L C L H H X X X X X X X L X  L L L H X L L X
L C L H H X X X X X X X L X  L L L H X L L X
L C L H L H X X X X X L X    L L L L X L L X
L C L X L X X X X X X X X    L L H L X L L X
;
L X L H L X X X X X X X X    L L H L X L L X  ;SET A20
L C L H H H H L H L L L H    L L H H H L L X     ;64 WRITE D1
L C L H H H H L H L L L H    L H H H H L L X
L C L H H H H L H L L L H    L H H H H L L X
L C L H L H H H L H L L L H  L H H L H L L X
L C L X L X X X X X X X X    L H L L X L L X
;
L C L H L X X X X X X X X    L H L L X L L X  ;64 WRITE D1 AGAIN
L C L H H H H L H L L L H    L H L H H L L X
L C L H H H H L H L L L H    H H L H H L L X
L C L H H H H L H L L L H    H H L H H L L X
L C L H L H H H L H L L L H  H H L L H L L X
L C L X L X X X X X X X X    L H L L X L L X
;
L C L H L X X X X X X X X    L H L L X L L X  ;60 WRITE TO SET
L C L H H X X X X X X H X    L H L H X L L X  ;LATCH
L C L H H X X X X X X H X    L L L H X H L X
L C L H H X X X X X X H X    L L L H X H L X
L C L H L H X X X X X H X    L L L L X H L X
L C L X L X X X X X X X X    L L H L X H L X
;
L C H X X X X X X X X X X    L L H L X H L X  ;RESET
;
L C L H L X X X X X X X X    L L H L X H L X  ;D1 THEN FF, EAT BOTH
L C L H H H H L H L L L H    L L H H H L X       ;64 WRITE D1
L C L H H H H L H L L L H    L H H H H L X
L C L H H H H L H L L L H    L H H H H L X
L C L X L X X X X X X X X    L H L L X H L X
;
L C L H L X X X X X X X X    L H L L X H L X  ;64 WRITE FF
L C L H H H H H H H H H H    L H L H H H L X
L C L H H H H H H H H H H    L L L H H H L X
L C L H H H H H H H H H H    L L L H H H L X
L C L H L H H H H H H H H    L L L L H H L X
L C L X L X X X X X X X X    L L H L X H L X
;
```

FROM FIG. 8B

```
L C L H L X X X X X X X X    L L H L X H L X    ;D1 THEN 64 WRITE,
L C L H H H H H L H L L L H  L L H H H H L X    EAT ONLY D1
L C L H H H H H L H L L L H  L H H H H H L X         ;64 WRITE D1
L C L H H H H H L H L L L H  L H H H H H L X
L C L H L H H H L H L L L H  L H H L H H L X
L C L X L X X X X X X X X    L H L L X H L X
;
L C L H L X X X X X X X X    L H L L X H L X    ;64 WRITE 00
L C L H H H L L L L L L L L  L H L H L H H X
L C L H H H L L L L L L L L  L L L H L H H X
L C L H H H L L L L L L L L  L L L H L H H X
L C L H L H L L L L L L L L  L L L L L H L X
L C L X L X X X X X X X X    L L H L X H L X
```

FIG. 9

```
  CLK /RST A2 XD0/ WC80421 /FF_FE_D1 I5 I6 HLFCLK GND
  /OC /WC80420 /C4/ C3 /C2/ C1 /C0 /C5 /CPURES VCC
           ;DON'T MASK NON FF,FE,D1 DATA
WC80420 = WC80421 * /C0 * /C1 * /C1 * /C3 * /C4 * /FF_FE_D1
           ;DON'T MASK FF,D1 DATA
        + WC80421 * /C0 * /C1 * /C2 * /C3 * /C4 * /C5 * XD0
           ;DON'T MASK PORT 60H WRITES
        + WC80421 * /C0 * /C1 * /C2 * /C3 * /C4 * /C5 * /A2
CPURES = C4 * C5 ;ASSERT CPU RESET SIGNAL ONLY DURING LAST QUARTER OF COUNT
                 ;DELAY 15 MICROSECONDS TO START OF 5 MICROSECOND PULSE
           ;START IF FE TO 64
C0  := /RST * WC80421 * FF_FE_D1 * /XD0 * A2 * /C0*/C1*/C2*/C3*/C4*/C5
     + /RST * HLFCLK * /C0 * C1              ;TOGGLE WHEN RESET ACTIVE
     + /RST * HLFCLK * /C0 * C2
     + /RST * HLFCLK * /C0 * C3
     + /RST * HLFCLK * /C0 * C4
     + /RST * HLFCLK * /C0 * C5
     + /RST */HLFCLK *  C0

C1  := /RST * /C1 * C0 * HLFCLK              ;FORM HIGHER COUNTER BITS
     + /RST *  C1 * /C0
     + /RST *  C1 * /HLFCLK

C2  := /RST * /C2 * C1 * C0 * HLFCLK
     + /RST *  C2 * /C1
     + /RST *  C2 * /C0
     + /RST *  C2 * /HLFCLK

C3  := /RST * /C3 * C2 * C1 * C0 * HLFCLK
     + /RST * /C3 * C2
        + /RST *  C3 * /C1
     + /RST *  C3 * /C0
     + /RST *  C3 * /HLFCLK

C4  := /RST * /C3 * C3 * C2 * C1 * C0 * HLFCLK
     + /RST *  C4 * /C3
     + /RST *  C4 * /C2
     + /RST *  C4 * /C1
     + /RST *  C4 * /C0
     + /RST *  C4 * /HLFCLK

C5  := /RST * /C5 * C4 * C3 * C2 * C1 * C0 * HLFCLK
     + /RST *  C5 * /C4
     + /RST *  C5 * /C3
     + /RST *  C5 * /C2
     + /RST *  C5 * /C1
     + /RST *  C5 * /C0
     + /RST *  C5 * /HLFCLK
```

FIG. 10A

```
/OC CLK RST WC80421 A2 XD0 FF_FE_D1 HLFCLK
C5 C4 C3 C2 C1 C0 WC80420 CPURES

;          W                       W
;          C        F H            C C
;          8        F L            8 P
;          0        F F            0 U
;/  C  R   4    X  E C             4 R
:0  L  S   2  A D D L   C C C C C  2 E
;C  K  T   I  2 0 1 K   5 4 3 2 1  0 S
_________________________________________________________

L  C  H   X  X X X X   L L L L L  X L        ;RESET
;
 L  C  L   L  X X X X   L L L L L  L L   ;NO SELECT
 L  C  L   H  L X X X   L L L L L  H L   ;PORT 60-- PASS THRU
 L  C  L   H  X H X X   L L L L L  H L   ;FF OR D1-- PASS THRU
 L  C  L   H  X X L X   L L L L L  H L   ;NOT FF, FE, OR D1-- PASS THRU
;
 L  C  L   H  H L H H   L L L L H  L L   ;FE WRITE TO PORT 64-- START
;                                                 RESET SEQUENCE
 L  C  L   X  X X X L   L L L L H  L L   ;START COUNTING
 L  C  L   X  X X X H   L L L H L  L L
 L  C  L   X  X X X L   L L L H L  L L
 L  C  L   X  X X X H   L L L H H  L L
 L  C  L   X  X X X L   L L L H H  L L
 L  C  L   X  X X X H   L L H L L  L L
 L  C  L   X  X X X L   L L H L L  L L
 L  C  L   X  X X X H   L L H L H  L L
 L  C  L   X  X X X L   L L H L H  L L
 L  C  L   X  X X X H   L L H H L  L L
 L  C  L   X  X X X L   L L H H L  L L
 L  C  L   X  X X X H   L L H H H  L L
 L  C  L   X  X X X L   L L H H H  L L
 L  C  L   X  X X X H   L H L L L  L L
 L  C  L   X  X X X L   L H L L L  L L
 L  C  L   X  X X X H   L H L L H  L L
 L  C  L   X  X X X L   L H L L H  L L
 L  C  L   X  X X X H   L H L H L  L L
 L  C  L   X  X X X L   L H L H L  L L
 L  C  L   X  X X X H   L H L H H  L L
 L  C  L   X  X X X L   L H L H H  L L
 L  C  L   X  X X X H   L H H L L  L L
 L  C  L   X  X X X L   L H H L L  L L
 L  C  L   X  X X X H   L H H L H  L L
 L  C  L   X  X X X L   L H H L H  L L
 L  C  L   X  X X X H   L H H H L  L L
```

FROM FIG. 10A

```
L C L X X X X L    L L H H H L L L
L C L X X X X H    L L H H H H L L
L C L X X X X L    L L H H H H L L
L C L X X X X H    L H L L L L L L
L C L X X X X L    L H L L L L L L
;
;   L C L L X X X H    L L L L L L L L   ;RETURN TO NORMAL
;
;          W                   W
;          C         F         C  C
;          8         F         8  P
;          0         F         0  U
; / C R    4    X    E         4  R
```

PROGRAMMABLE LOGIC SYSTEM FOR FILTERING COMMANDS TO A MICROPROCESSOR

The present application is a continuation of copending application Ser. No. 07/088,093, filed Aug. 21, 1987, now U.S. Pat. No. 5,226,122, issued Jul. 6, 1993.

BACKGROUND OF THE INVENTION

1. Field of the Invention

This invention relates to regulating the operations of a microprocessor by the use of one or more programmable logic arrays or gate arrays for filtering of certain commands to the microprocessor. More particularly, it relates to the use of programmable logic arrays or gate arrays for monitoring commands to a keyboard controller in a personal computer based on either the INTEL 80286 or 80386 microprocessor, and intercepting certain of those commands relating to the FORCE-A20 and CPU-RESET signals.

2. Description of the Related Art

In many popular personal computers based on the INTEL 80286 or 80386 microprocessor, there is a need for utilizing both real-address mode ("real mode") and protected mode. Real mode is used for initialization when first powered up, and mimicking of older 16-bit microprocessors, such as the INTEL 8086 family of microprocessors. In real mode, the 80286 or 80386 microprocessor uses segment and offset registers in the same way as the 8086 family to access the same one megabyte of memory. In real mode, the 16-bit instruction set, the segmented programming model, addressing mechanism, and one megabyte physical memory limitations are identical to those provided by the 80186Thus the 80286 and 80386 microprocessors are compatible with the addressing scheme of the 8086 family.

In protected mode, the 80286 or 80386 microprocessor adds a series of features that allow it to safely and reliably expand the number of programs the computer can be working on at one time. This is accomplished through four main facilities: protection, extended memory, virtual memory, and multi-tasking. Protection allows the operating system to erect barriers to prevent a program from interfering with the operation of other programs or of the operating system itself. Extended memory greatly increases the amount of working memory beyond the 640 KB actually available to the software. Virtual memory allows the computer to go further beyond the installed physical memory limitations by shifting data to and from remote memory, such as hard disk. Finally, with multi-tasking supported by the hardware, the 80286 or 80386 can swiftly and reliably switch among several programs that are running at the same time.

A basic difference between protected mode and real mode is that the protected mode segment register is no longer a real (i.e., physical) address. Instead, in protected mode, the 80286 or 80386 uses the upper (most significant) 14 bits of the segment register to look up a 24-bit base address (with the 80286 ) or a 32-bit base address (with the 80386 ) stored in a descriptor table in memory.

Additionally, with protected mode, segment registers define the way that memory is organized between tasks. Each task has its own descriptor table describing the segments for that task. Since physical addresses are stored in the descriptor table rather than in the segment registers, the operating system can move memory around without application programs being affected.

Protected mode is so named because segments belonging to one task are protected from being corrupted by another task. Tasks are organized in privilege levels, and certain machine-code instructions are prohibited to lower privilege levels. In a well-designed protected mode operating system, a single program can neither crash the whole system nor get itself into an unrecoverable state.

Many personal computers based on the 80286 or 80386 microprocessors implement the "FORCE-A20" function. This function is necessary to maintain compatibility with software designed for systems based on the 8086 family of microprocessors.

The compatibility issue arises from the different memory address sizes available on the 8086, 80286, and 80386 chips. The 8086 had a one megabyte address range, with twenty address lines (A0–A19) driven by the microprocessor. The total range was 2 raised to the 20th power, or U.S. Pat. No. 1,048,576 possible addresses (one megabyte). In contrast, the 80286 has 24 address lines, giving 16 megabytes of address range (2 raised to the 24th power); the 80386 has 32 address lines, giving 4096 megabytes of address range (2 raised to the 32nd power).

The 8086 microprocessor uses a segmented memory addressing scheme. The effect of this scheme is to allow a software program to access only a 64 KB "window" out of the one megabyte total range. To access memory outside this window, the window's location must change, and this operation takes time.

To access memory near the top of the one megabyte address space as well as memory near the bottom of the 8086's one megabyte address space, without moving the window, some software takes advantage of "memory wrap-around". This feature on the 8086 may be used when the base of the 64 KB window is less than 64 KB from the top of the one megabyte address range, so the top of the window would extend beyond the highest possible address location. When the window is in such a position, these impossibly high addresses are simply "wrapped around" to low addresses, much in the same way that an odometer goes from 99,999 to 00,000 miles. Thus, software could access very high as well as very low addresses in the same window.

Since the 80286 and 80386 microprocessors have more than one megabyte of address range, these microprocessors do not wrap around memory addresses at one megabyte. Instead, accesses to the part of the window above one megabyte are put out as actual addresses greater than one megabyte.

The difference between the old 8086 "wrapped around" low addresses and the new 80286/80386 high addresses is that the new 80286/80386 microprocessors have extra address lines beyond A19 (much like having extra digits on an odometer, so it doesn't wrap around after 99,999 miles). The first of these address lines on the 80286 or 80386 is A20, and it is set high for all addresses in the range from one megabyte to two megabytes (in the absence of the FORCE-A20 command). The A20 line is set low for addresses below one megabyte.

In real mode, the 80286 and 80386 microprocessors behave as much as possible like the 8086 microprocessors. Thus, in real mode the 80286 and 80386 cannot access memory above one megabyte. Because the 80286 or 80386 have more than one megabyte address range, the wrap-around feature of the 8086 family of microprocessors does not work on the 80286 or 80386 (in real mode) unless the A20 line is low. When the A20 line is low, the 80286 or 80386 can simulate the wrap-around feature.

To allow software with wrap-around windows to operate on the 80286 or 80386 microprocessors, the prior art has employed various techniques to intercept the A20 line from the microprocessor and force it low. Forcing the A20 line low makes addresses put out by the microprocessor in the range of between one and two megabytes result in an address one megabyte lower. The signal that causes the A20 line to stay low is called "FORCE-A20".

When the 80286 or 80386 microprocessor returns from real mode back to protected mode, the FORCE-A20 signal must be turned off, so that the software has the ability to use the full address range (beyond one megabyte) available to the microprocessor. The FORCE-A20 signal does not actually cause the microprocessor to switch between protected and real mode. The actual switching of modes is accomplished either by executing special instructions in the microprocessor or by resetting the microprocessor. Setting the FORCE-A20 signal is simply something that must be done by the software program to insure the wrap-around feature will not prevent proper functioning of the program.

In the prior art, the FORCE-A20 signal was controlled by an extra output pin on the 8042 keyboard controller. This prior art solution was chosen because the extra output pin was not otherwise needed, and because at the time nobody foresaw any need to switch between real and protected mode more than occasionally. The problem, however, of putting the FORCE-A20 signal under the control of the 8042 keyboard controller was that access to the signal was possible only by sending a command to the 8042, which then executed a routine to alter the state of the output pin. This process typically takes approximately 200 microseconds. The delay was found to be undesirable in many applications.

Many of the protected mode software programs utilizing the 80286 or 80386 microprocessors must disable the FORCE-A20 signal before switching to protected mode, and then enable it after returning to real mode. The prior art has controlled the FORCE-A20 signal by sending commands to the 8042 keyboard controller. Some of the newer software has needed to switch between protected and real mode very frequently, so that the delay for switching (approximately 200 microseconds) caused by the 8042 keyboard controller became a significant part of the program's execution time.

The present invention solves the delay problem resulting from utilizing the 8042 to control the FORCE-A20 signal, so that all existing software that calls on the 8042 to change the FORCE-A20 signal is not obsolete and the delay caused by the 8042 is reduced substantially.

The prior art has attempted to solve this delay problem by installing an additional, separate hardware port for the FORCE-A20 signals. This attempted solution, however, is incompatible with much of the existing software which utilizes the existing port on the 8042. Therefore, a need exists for implementing the FORCE-A20 command without delay by the 8042 keyboard controller, in a system compatible with existing software.

Many personal computers based on the 80286 or 80386 microprocessors also implement the "RESET-CPU" function. The RESET-CPU command activates the RESET-CPU signal, which addresses the 80286 or 80386 microprocessor reset input. When the signal is activated, it causes the microprocessor to stop whatever it is doing and start its initialization sequence.

One use for the RESET-CPU command is to switch from protected mode to real mode in a system based on the 80286. When the 80286 microprocessor is reset, it defaults to real mode. The RESET-CPU command, however, is not generally used by application software because it may cause the system to reboot. The system does provide that control can be returned to a program already residing in memory even after the CPU has been reset. Thus, if a protected mode program wishes to switch to real mode on an 80286 microprocessor, the program must reset the CPU, then regain control after the reset occurs.

It should be noted that the 80386 microprocessor, unlike the 80286, provides a specific instruction to switch from protected to real mode. However, software developed for the 80286 does not utilize this 80386 specific instruction.

If a software program switches from protected to real mode frequently, then it must reset the CPU frequently. The RESET function is a strobe or pulse typically controlled by the 8042 keyboard controller. In the prior art, the command to change the CPU-RESET signal has utilized yet another extra pin on the 8042, just as the FORCE-A20 signal utilized an extra pin. In the prior art, the 8042 RESET-CPU command holds that signal active for a short period of time: i.e., about five microseconds. The RESET-CPU signal resets the CPU, and then allows it to restart. However, since the 8042 hardware controls this function, the software program must wait for the relatively slow 8042 to respond during every RESET. Because the signal utilizes an extra pin on the 8042, there is typically a delay of approximately 200 microseconds for the 8042 to respond to the command: i.e., from the time that the CPU-RESET strobe command is sent to the 8042 until the time the 8042 starts the strobe. This additional 200 microsecond delay was found to be undesirable in many applications.

Attempted solutions to this delay problem include installing an additional, separate hardware port for the CPU-RESET signal, but this attempted solution is incompatible with much of the existing software. Another alternative method is to cause a CPU-RESET from software without using the 8042. This alternative is called a "triple fault". The triple fault is done by intentionally causing an execution error while in protected mode. When this happens, the CPU will automatically begin executing an error handling routine. If there is also an error in the first routine, the CPU goes to a second error handling routine. If there is an error in the second error handling routine, the CPU resets itself. Although this triple fault sequence is faster than the 8042 hardware reset, this approach has not been utilized by existing software applications. Therefore, the need exists for implementing the CPU-RESET signal, compatible with existing software and without delay inherent in the 8042 keyboard controller.

SUMMARY OF THE INVENTION

The present invention resides in a programmable system for filtering commands to a microprocessor, including at least one gate array or programmable logic array for allowing all input commands to pass directly through to the microprocessor except a designated sequence of input commands. The present invention is particularly well suited to select and process commands relating to switching between real and protected mode in a personal computer based on the INTEL 80286 or INTEL 80386 microprocessor. Such personal computers include those manufactured by IBM and COMPAQ.

In a preferred embodiment, the present invention resides in the use of one or more programmable logic arrays or gate arrays to monitor the commands to the INTEL 8042 keyboard controller and intercept certain of those commands relating to the FORCE-A20 and CPU-RESET signals. One or more programmable logic arrays or gate arrays allow all commands to pass directly through to the 8042 except the specific sequence of commands relating to the signals necessary for FORCE-A20 and CPU-RESET. The signals, which previously came from the 8042 relating to the FORCE-A20 and CPU-RESET signals, according to the present invention, are controlled by the programmable logic arrays or gate arrays as a hardware patch around the 8042. The result of the programmable logic array or gate array implementation is that programmable hardware is used to reduce the time delay for implementing the FORCE-A20 and CPU-RESET signals.

BRIEF DESCRIPTION OF THE DRAWINGS

FIGS. 8A, 8B, 8C are a listing of the function table for the PAL of FIGS. 1 or 5;

DETAILED DESCRIPTION OF THE PREFERRED EMBODIMENT

Figure 1:
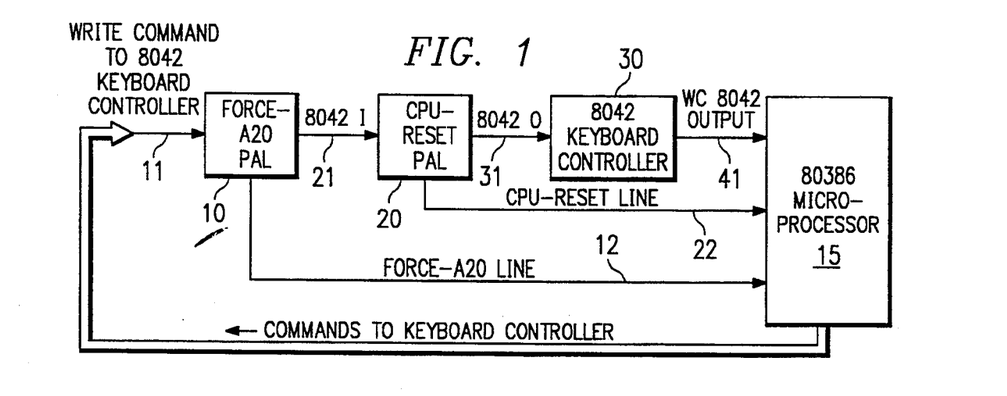
FIG. 1 is a Block Diagram of the Programmable Logic Array System for Filtering Commands to a Microprocessor according to the present invention.

Referring to FIG. 1, a preferred embodiment of the present invention comprises the use of at least one programmable logic array or gate array 10 or 20 to monitor the commands 11 to the 8042 keyboard controller 30 and intercept certain of those commands relating to the FORCE-A20 and CPU-RESET signals. Each programmable logic array 10 or 20 is an array of AND/OR gates and registers that can be interconnected in a combinational logic design. A gate array is simply a large number of gates placed on the chip in fixed locations that can be interconnected during the final stages of semiconductor manufacture. Essentially, a programmable logic array or gate array is a programmable, function-specific hardware component. Throughout the disclosure, the terms programmable logic array, gate array and "PAL" will be used interchangeably. The term "PAL" as used in this disclosure is a registered trademark of Monolithic Memories, Inc., 2175 Mission College Blvd., Santa Clara, Calif. 95054, referring to certain species of programmable logic arrays.

The PAL or gate array 10 or 20 described in this invention controls the FORCE-A20 and CPU-RESET signals in personal computers based on the INTEL 80286 and 80386 microprocessors. According to the prior art, these signals are controlled 30 by the 8042 keyboard controller. The PAL implementation enhances performance for software applications that do frequent switching between real mode and protected mode.

The A20 address line allows or disallows one megabyte wraparound memory, a feature necessary for implementing certain software designed for the 8086 family of microprocessors. The FORCE-A20 signal 12 is used to force the A20 address line low. Forcing the A20 address line low is one of the several steps necessary to successfully switch the 80286 or 80386 microprocessor from protected to real mode. Through the use of an AND gate or similar logic, the A20 output is held low if the FORCE-A20 line 12 goes low. When FORCE-A20 drives the A20 line low, the wrap-around feature is simulated. If the FORCE-A20 line 12 is high, the A20 line is unaffected, that is, the A20 line remains low or high.

In the prior art, the FORCE-A20 line 12 was instructed via the 8042 controller device output port. There was a two-step command, described in more detail below, which was designed to set all eight bits on the 8042 output port. The FORCE-A20 line 12 is just one bit of those eight bits. As there was no need to set the other seven bits, the two-step command became associated solely with setting the A20 line.

The FORCE-A20 and CPU-RESET PAL or gate array devices 10 and 20 takes over the function of controlling the FORCE-A20 and CPU-RESET signals that were previously controlled by the 8042 keyboard controller 30. The PAL monitors all the commands 11 to the 8042 keyboard controller. If the PAL sees a command to change either the CPU-RESET 22 or the FORCE-A20 line 12, then the PAL does not allow the 8042 controller device 30 to see that command, but updates the signals 22 and 12 itself. The signals are sent to a designated port on the 80386 microprocessor 15.

As shown in FIG. 1, a preferred embodiment of the present invention comprises two PALs, which will be referred to as the FORCE-A20 PAL 10 and the CPU-RESET PAL 20. It should be understood, however, that the present invention may comprise a single programmable logic array, gate array or PAL performing the functions of both the FORCE-A20 and CPU-RESET PAL. It also will be understood that the particular logic sequence for the present invention (i.e., passing a signal first through the FORCE-A20 PAL 10, then through the CPU-RESET PAL 20) may be varied without departing from the present invention.

To filter the commands to the 8042 keyboard controller 30, the Write Command ("WC") input 11 to the 8042 is intercepted by the PAL or gate array 10 or 20. An output of the PAL, WC 8042, is sent by the 8042 device 30 to the 80386 microprocessor 15. The WC 8042 output 41 is active when the WC line is active, but goes inactive when a FORCE-A20 or CPU-RESET command is detected in input 11. If a FORCE-A20 or a CPU-RESET command is detected in input 11, the WC 8042 line 41 is held inactive. In such a case, the PAL 10 or 20 sends the FORCE-A20 signal 12 or CPU-RESET signal 22 to the 80286 or 80386 microprocessor 15.

The FORCE-A20 and CPU-RESET lines 12 and 22 are connected so that they are driven from the PALs instead of from the 8042. The 8042 controller device 30 write command 11 goes first through the FORCE-A20 PAL 10, and then through the CPU-RESET PAL 20. The command can be blocked by either PAL.

The FORCE-A20 line 12 is set and reset by a two-byte command sequence. The first byte, which indicates that the FORCE-A20 12 line is to be changed, is a write of the command word "D1" to port 64$h$ of the microprocessor 15. This write command indicates that a write to port 60$h$ of the microprocessor 15 is to follow. The second byte, which indicates the state that the FORCE-A20 line 12 will go to, is the actual data to be sent to the output port. The data is written to port 60$h$. Bit 1 of the second byte is the new FORCE-A20 line 12 status. Both commands are masked out of the 8042 controller device 30 by the FORCE-A20 PAL 10. The FORCE-A20 PAL will always mask a write of D1$h$ to port 64$h$ from the 8042 controller device 30.

Figure 2:
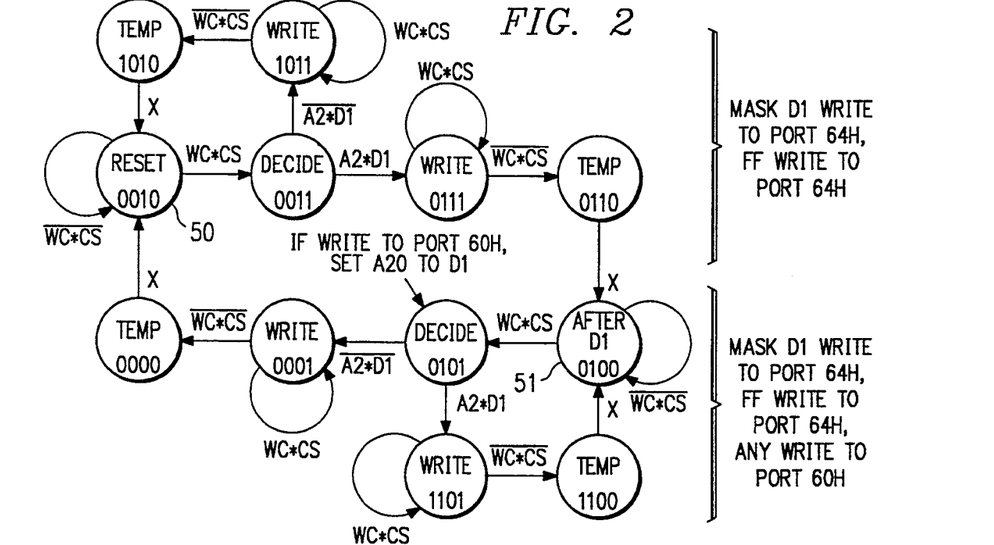
FIG. 2 is a state diagram executed by the FORCE-A20 programmable array logic device 10 of FIG. 1.

Referring to FIG. 2, the FORCE-A20 PAL 10 has two basic states: the "RESET" state 50 and the "AFTER-D1" state 51. The FORCE-A20 PAL 10 normally is in the "RESET" state. After every write of D1$h$ to port 64$h$, the FORCE-A20 PAL 10 goes into the "AFTER-D1" state. In this state, the FORCE-A20 PAL will mask any data write command to port 60. If a write command to port 60$h$ occurs, the FORCE-A20 is set to the value of bit one of the input data. When the PAL is in the "RESET" state, any write command to the 8042 except a D1$h$ write command to port 64$h$ will leave the FORCE-A20 PAL in the "RESET" state. When the PAL is in the "AFTER-D1" state, the next state of the FORCE-A20 line (if it is a write to port 60) is determined by bit 1 of the input data.

Thus the FORCE-A20 PAL 10 lets all the commands through to the 8042 controller device 30 until the sequence of commands to toggle the FORCE-A20 line 12 comes through. The line FORCE-A20 command sequence is switched out of the 8042 controller device 30 and the PAL 10 takes over the operation and toggles the command line 12. The FORCE-A20 PAL 10 drives the FORCE-A20 line 12 directly.

Figure 5:
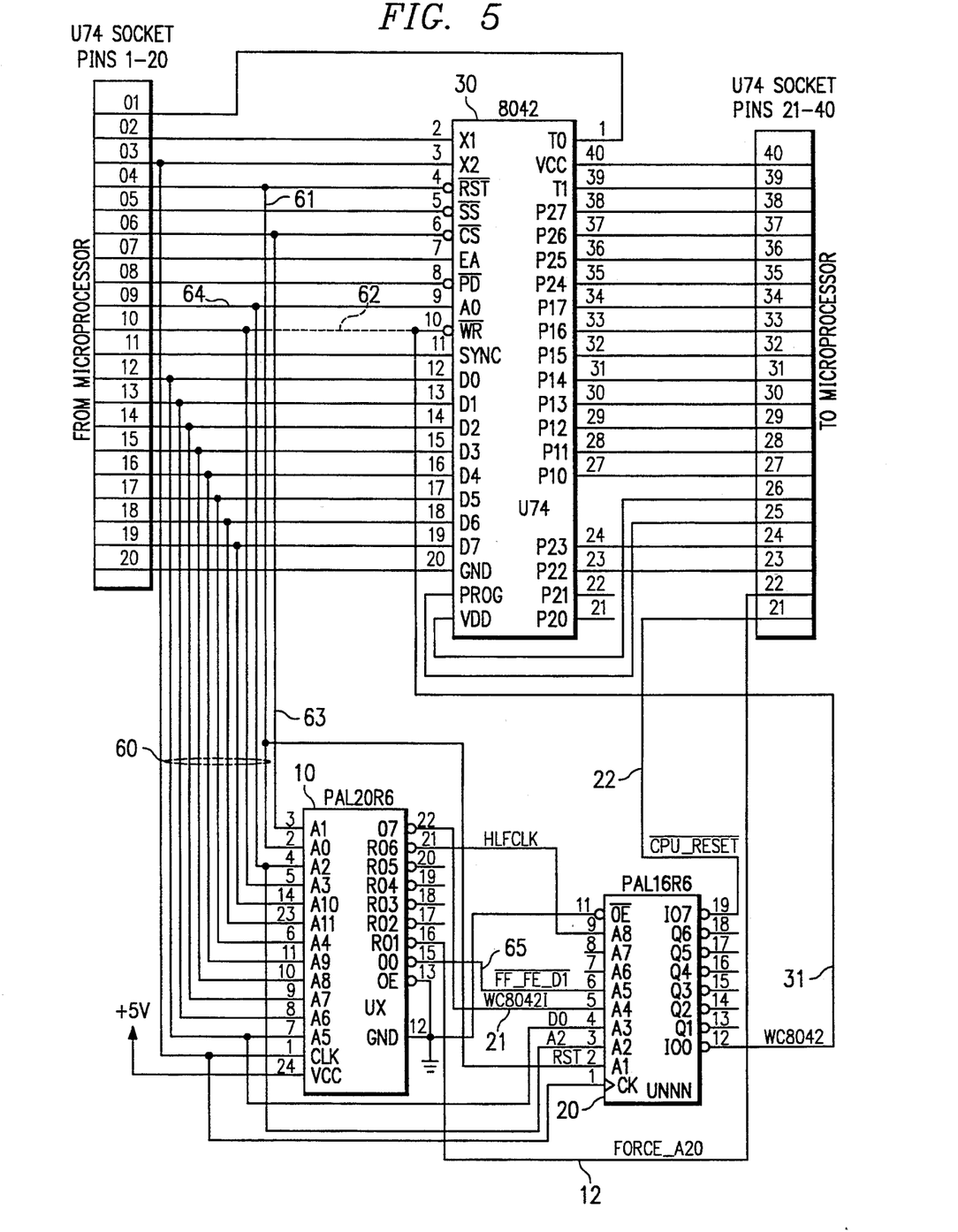
FIG. 5 is an electrical diagram in block form of the circuit of FIG. 1.

Referring to FIG. 5, there are four input commands to the FORCE-A20 PAL 10 in addition to the 8 data lines 60. The first command, "RST", goes active during a system reset and it resets the PALs 10 and 20. "WC", as mentioned previously, is the write command line 62 to the 8042 controller device that is intercepted by the FORCE-A20 PAL 10. "CS" is a chip select signal that selects the 8042 controller device 30 on the I/O bus. The PALs 10 and 20 do not respond to a write on the bus unless the "CS" command is present. "A2" on line 64 is the address line used by the PALs 10 and 20 to determine whether a write command on line 62 is to port 60$h$ or to port 64$h$.

The present invention utilizes at least one flip-flop to indicate whether the FORCE-A20 is in the RESET or AFTER-D1 state. In a preferred embodiment, the FORCE-A20 PAL 10 includes four flip-flops: Q0, Q1, Q2, and Q3. One of the state flip-flops, Q0, is always set to the value of WC * CS, and as a result, Q0 gives a synchronous version of the write command signal. The FORCE-A20 PAL 10 switches between the "RESET" state and the "AFTER D1" state 51 only between write cycles and not during them. The information about whether the FORCE-A20 PAL 10 is in the "RESET" state 50 or the "AFTER D1" state 51 is stored in the Q1 flip-flop. The information about which state the FORCE-A20 PAL 10 will go to after the current write cycle is stored in the Q2 and Q3 flip-flops, and this information is transferred to the Q1 flip-flop after the write cycle is completed.

The CPU-RESET PAL 20 monitors the WC 8042I line 21 from the FORCE-A20 PAL 10. The WC 8042 I signal transfers information from the FORCE-A20 PAL 10 to the CPU-RESET PAL 20; it is the 8042 write command signal after the FORCE-A20 commands have been filtered out, but before the CPU-RESET commands have been filtered out. If the WC 8042 I line 21 is active after the FORCE-A20 commands are filtered out, the CPU-RESET PAL 20 outputs the WC 8042 0 signal 31 unless there is an "FE" write to port 64$h$ of the microprocessor (in which case the 8042 controller device 30 does not see the command). The FE write to port 64$h$ triggers the CPU-RESET signal delay logic.

Of course, if the WC 8042 I line 21 to the CPU-RESET PAL 20 is inactive, the current command will be a FORCE-A20 related signal (FF or D1). The CPU-RESET PAL 20 can determine if an FE write to port 64$h$ is happening by looking at the FF-FE-D1 signal and the DO signal. The FF-FE-D1 signal on line 65 transfers information from the FORCE-A20 PAL to the CPU-RESET PAL 20. This signal tells the CPU-RESET PAL 20 that the FORCE-A20 PAL has decoded the current 8042 controller device 30 data to be either OFFh, OFEh, or OD1$h$.

It has been found that the CPU-RESET signal executes properly if there is some delay from the strobe command until the activation of the CPU-RESET signal. In a preferred embodiment, a delay of approximately 14 microseconds is built into the CPU-RESET PAL 20, along with an active strobe period of approximately 5 microseconds.

Figure 3A:
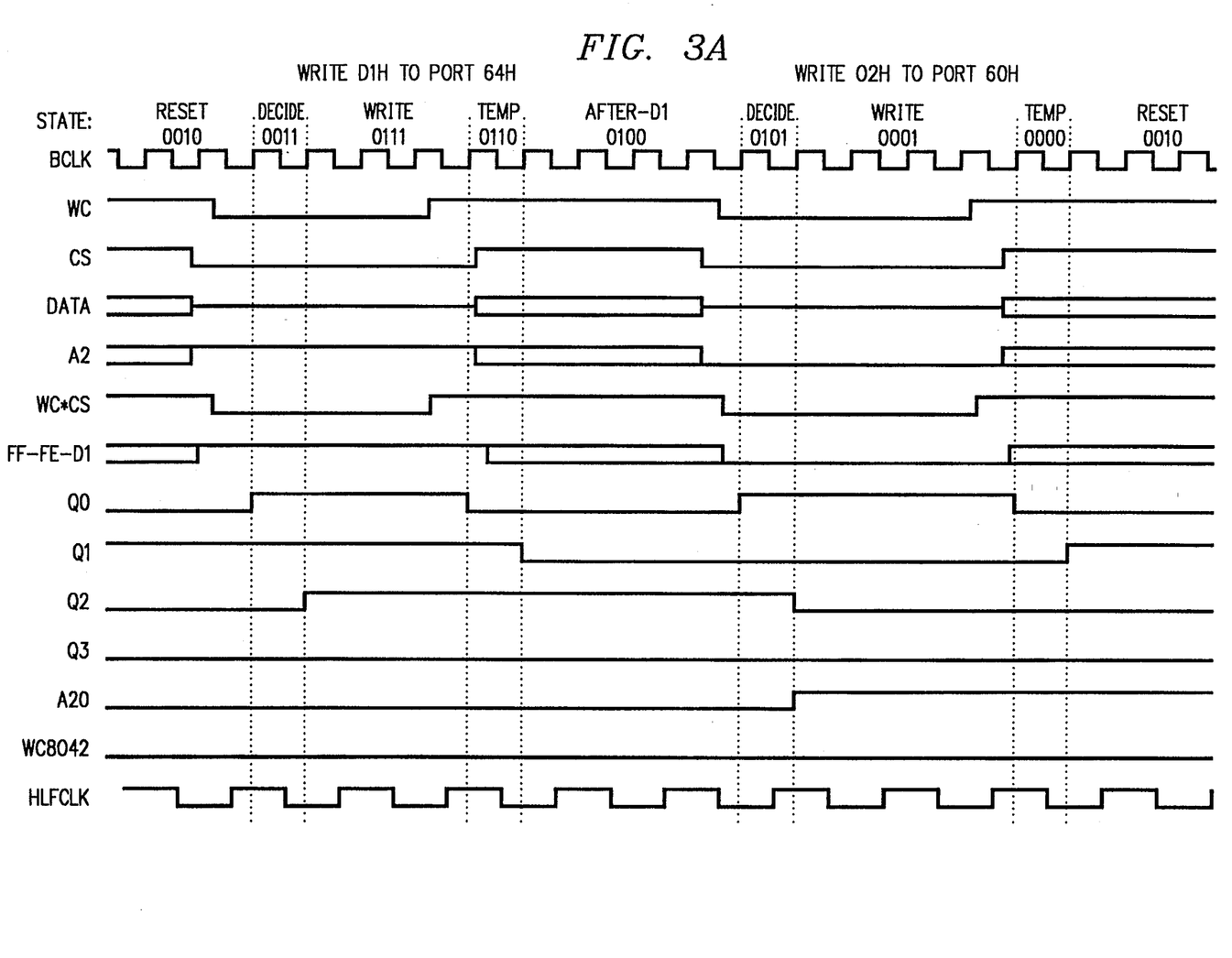
FIG. 3A is a timing diagram showing events vs. time for a FORCE-A20 command sequence in the circuit of FIG. 1.
Figure 3B:
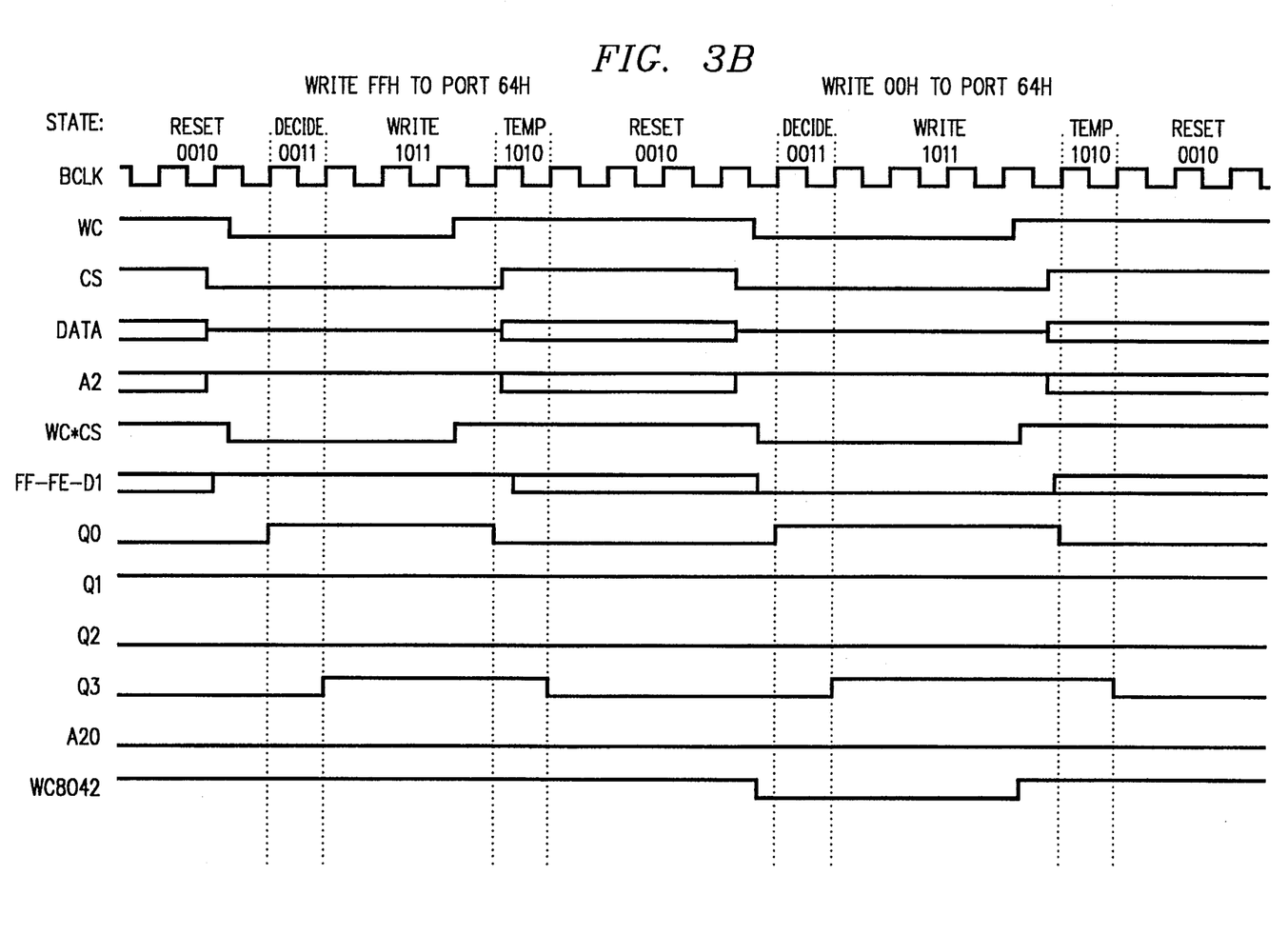
FIG. 3B is a timing diagram showing events vs. time for a CPU-RESET command sequence in the circuit of FIG. 1.
Figure 4:
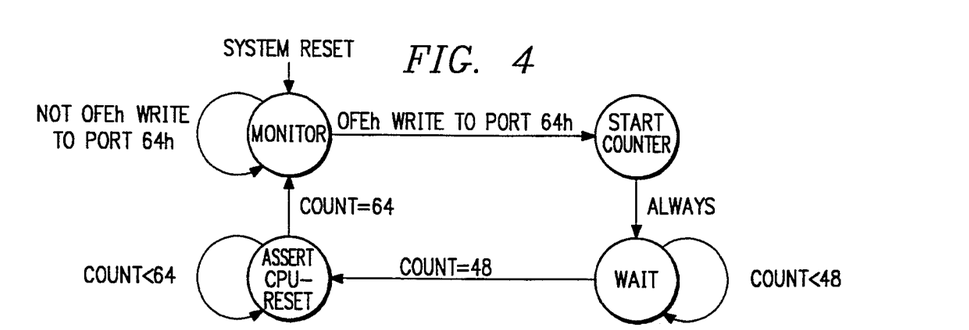
FIG. 4 is a state diagram executed by the CPU-RESET programmable array logic device 10 of FIG. 1.
Figure 6:
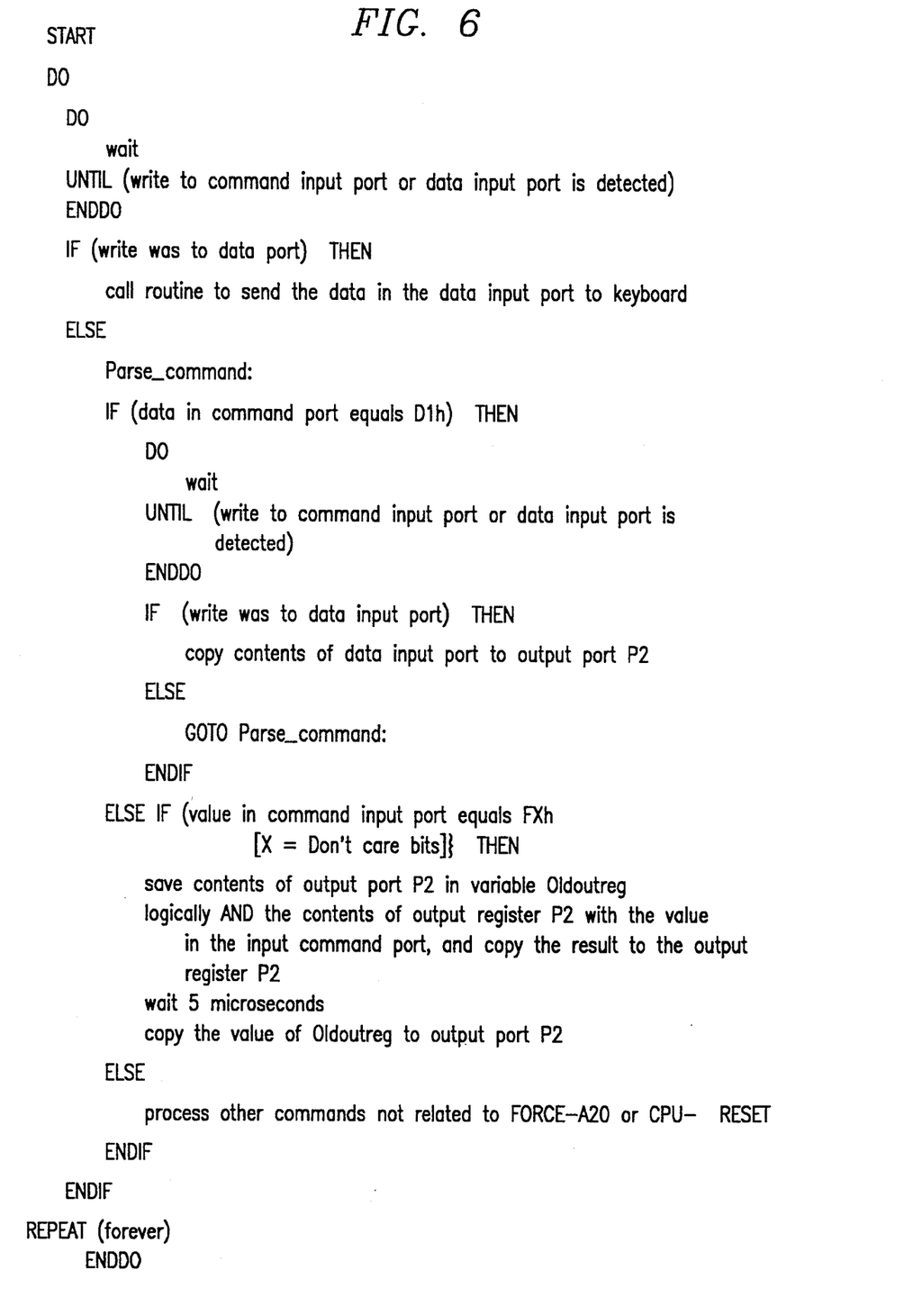
FIG. 6 is a program listing of pseudocode for the logic sequence performed by the 8042 controller 30 of FIG. 1 without the PALs 10 and 20 of the invention.
Figure 7A:
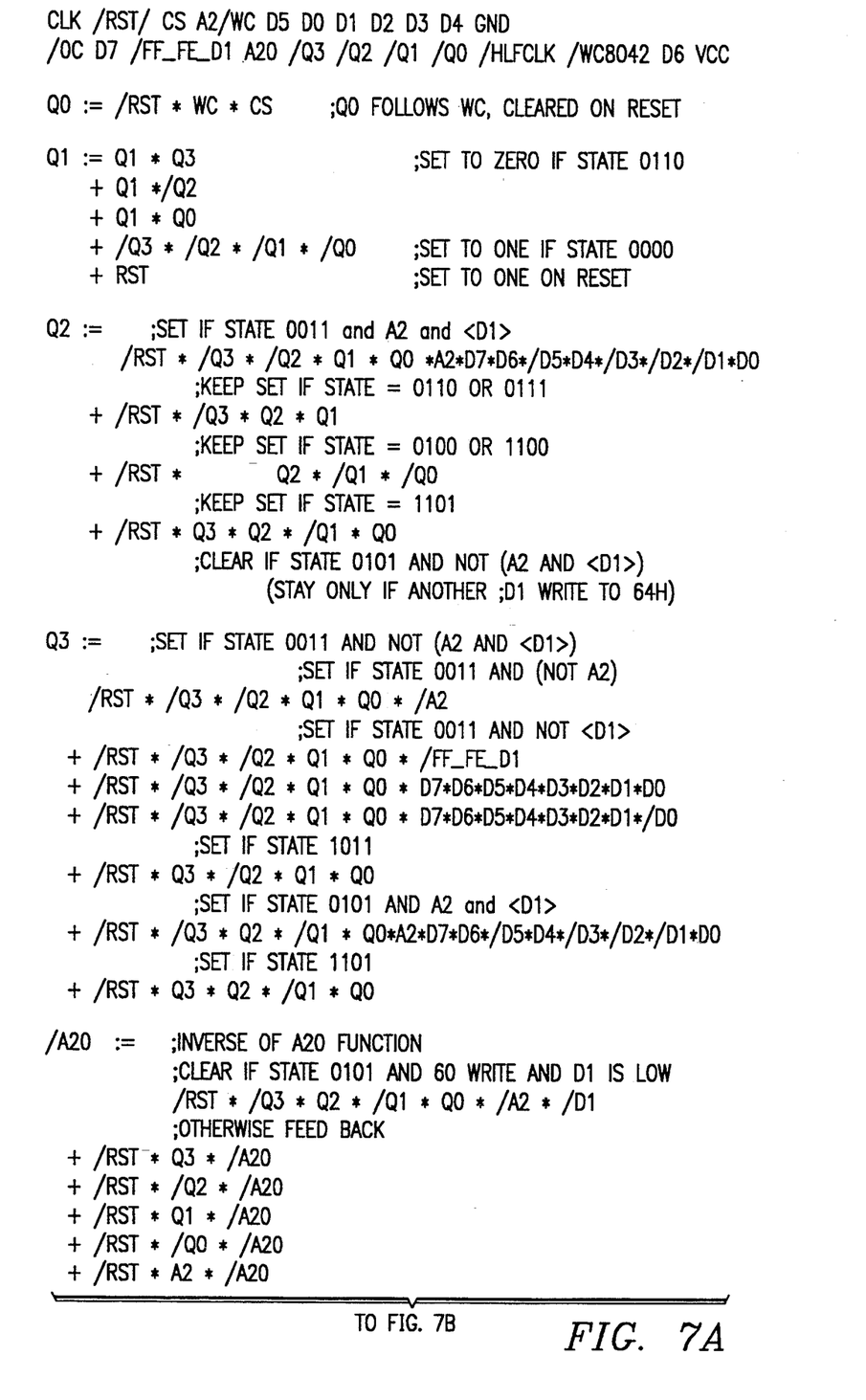
FIGS. 7A and 7B are a listing of the logic specification for the PAL 10 of FIGS. 1 or 5.
Figure 7B:
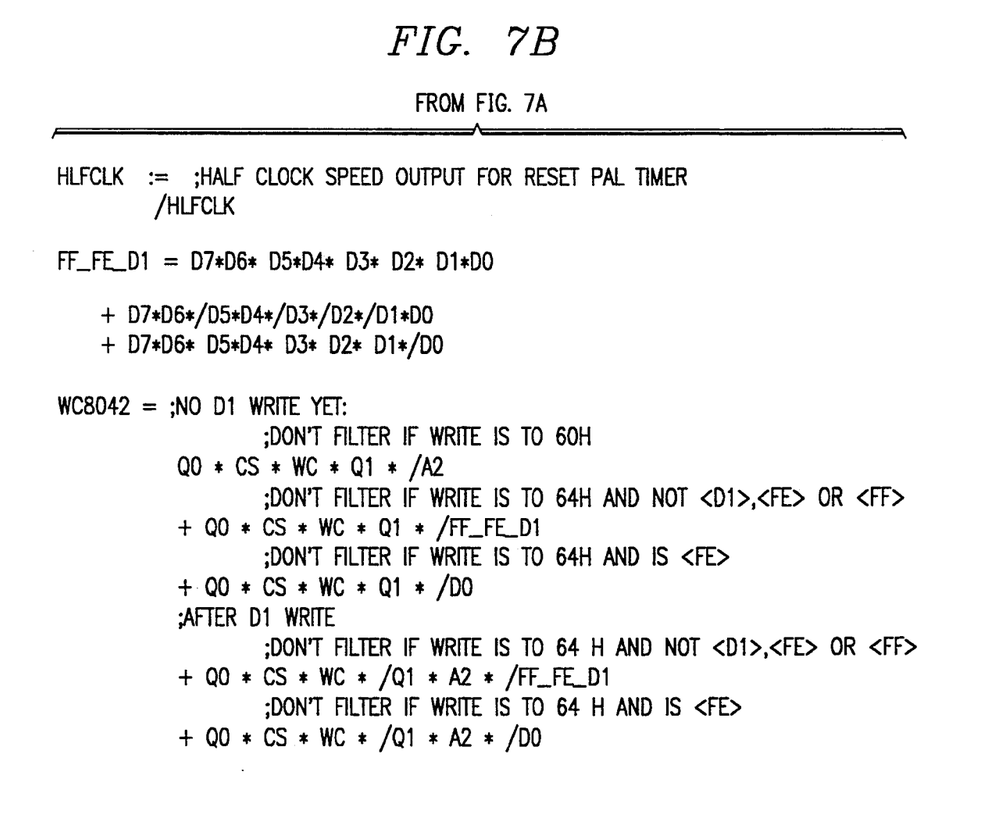
Figure 8C:
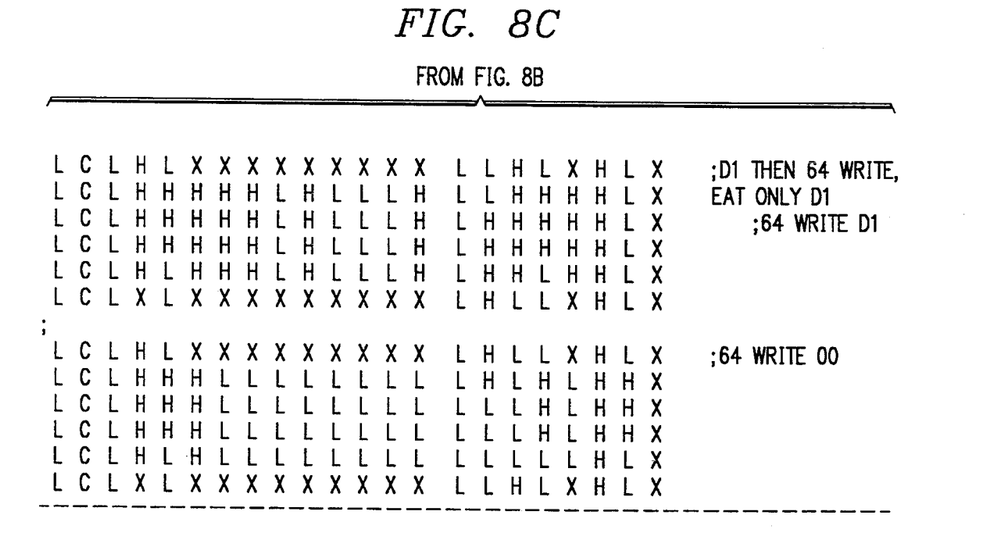
Figure 9:
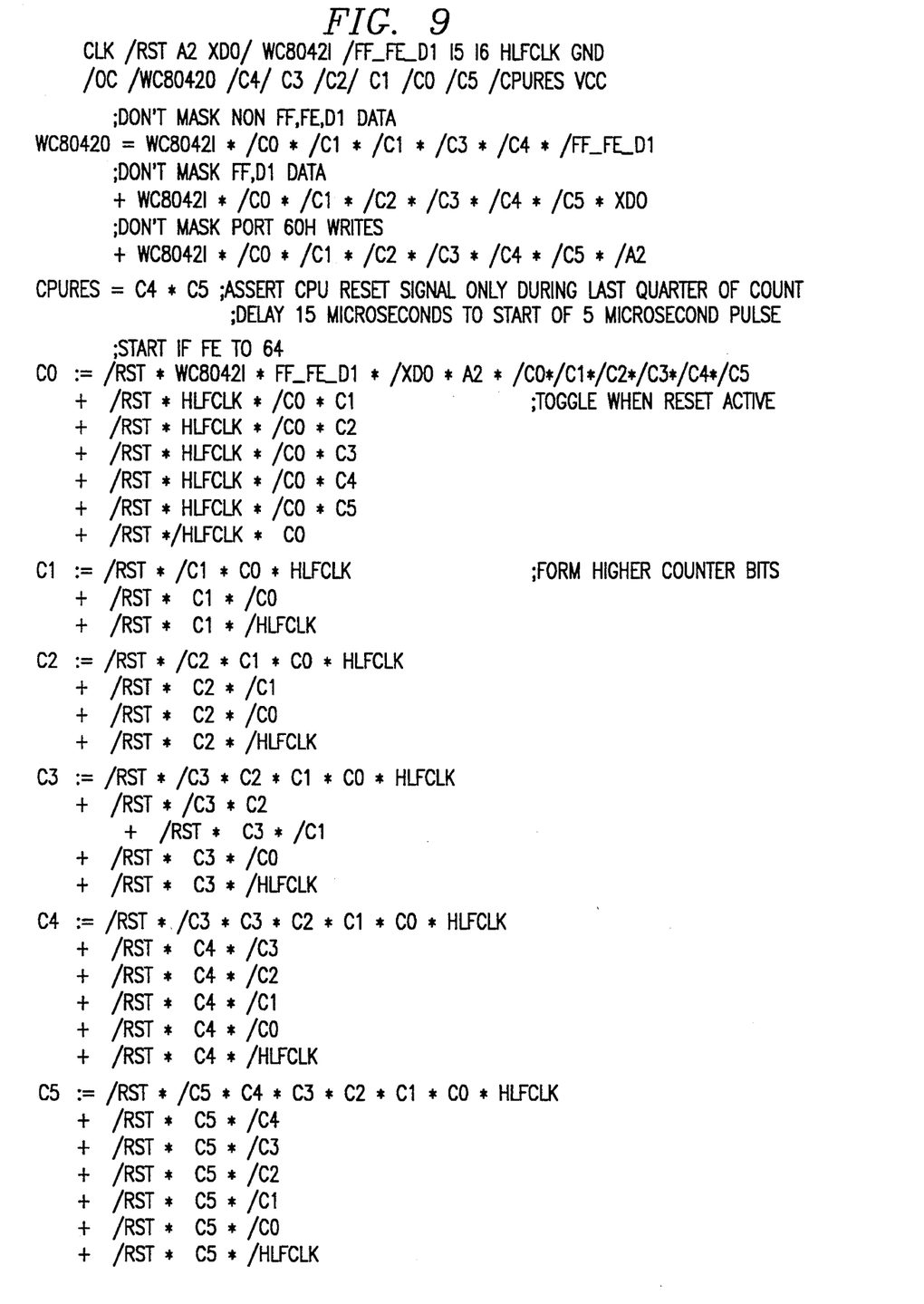
FIG. 9 is a listing of the logic specification for the PAL of FIGS. 1 or 5.
Figure 10A:
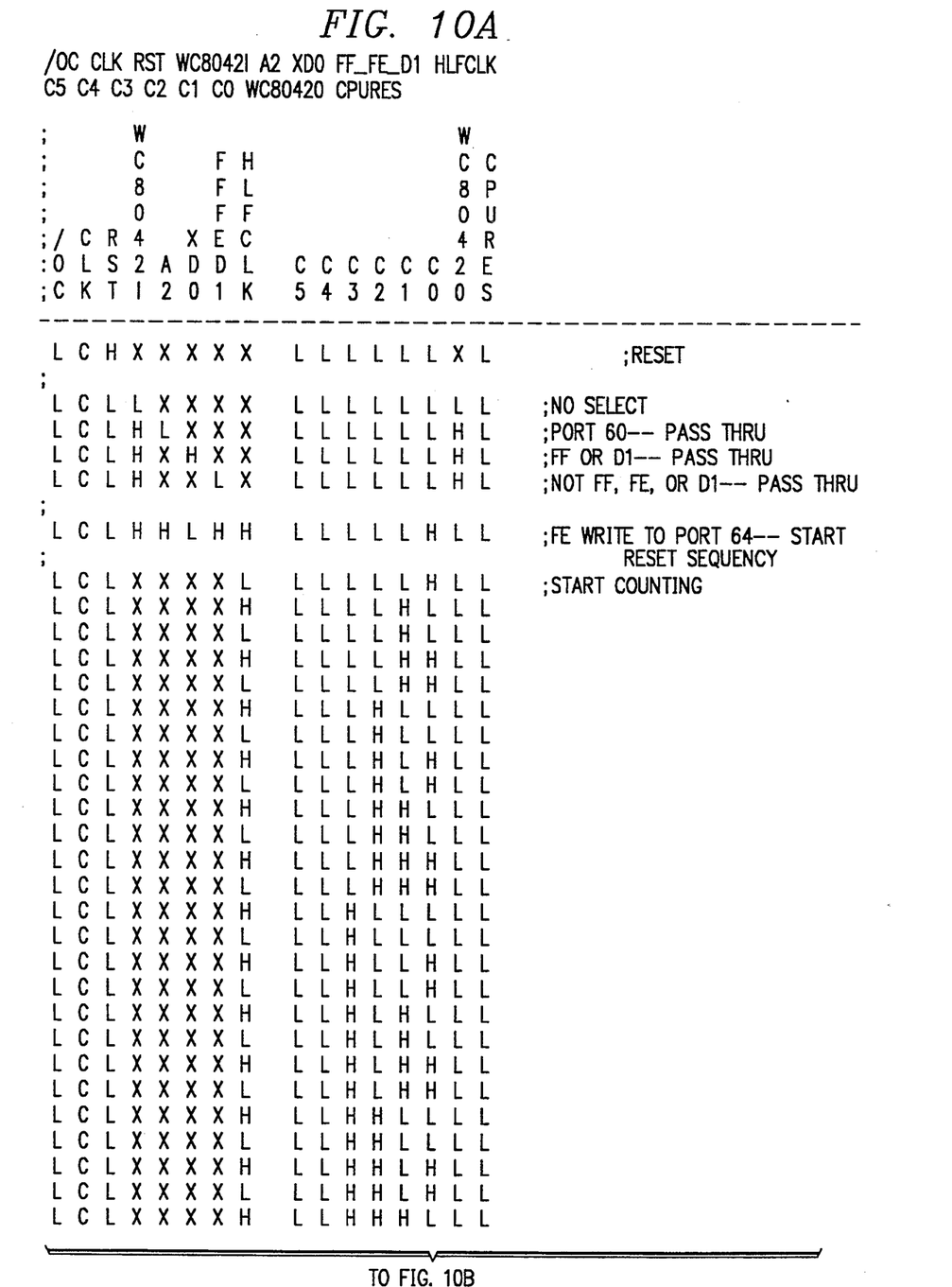
FIGS. 10A and 10B are a listing of the function table for the PAL 20 of FIGS. 1 or 5.
Figure 10B:
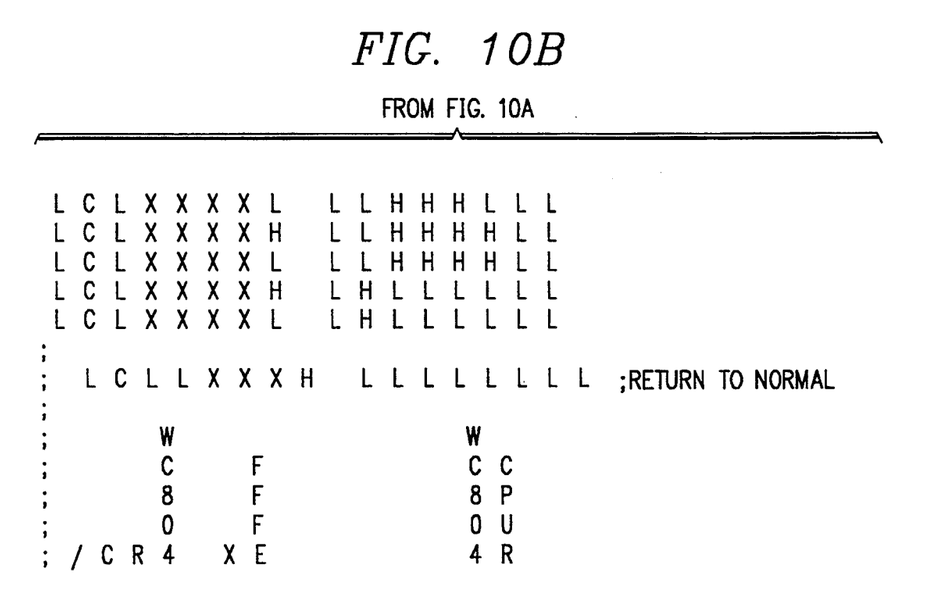

To achieve these delays, the CPU-RESET PAL 20 registers are set up as a 6 bit counter. The counter counts the pulses provided by the FORCE-A20 PAL 10 to the CPU-RESET PAL 20. The CPU-RESET PAL output 22 is activated when the two high order bits of the counter are both active, during the last quarter of the count cycle. Thus, where the pulses are 3.58 MHZ, there is a 13.41 microsecond delay until the strobe starts, and the strobe is active for 4.47 microseconds. This total of 17.88 microseconds corresponds to $2^6/3.58$ MHZ. After the counter reaches its maximum value,, it returns to the reset state. FIG. 2 is a PAL state diagram and FIG. 3A is a PAL timing diagram for the FORCE-A20 PAL 10 and the CPU-RESET PAL 20 likewise operates according to the state diagram of FIG. 4 and the timing diagram of FIG. 3B; as well FIG. 5 is as a schematic for the FORCE-A20/CPU-RESET test board. FIG. 7A and 7B are the PAL design specification for the FORCE-A20 PAL 10 and CPU-RESET PAL likewise FIG. 9 is the PAL design specification for the. FIG. 6 is a pseudocode for the 8042 which details the logic sequence for the FORCE-A20 and CPU-RESET functions.

Although a preferred embodiment of the present invention is intended for use with a personal computer based on the INTEL 80286 or 80386 microprocessor 15, with an INTEL 8042 keyboard controller 30, it will be realized that the present invention is not intended to be so limited. Instead, the present invention is intended to cover a system for allowing all input commands to pass directly through to the control device (such as the 8042 keyboard controller 30) except a designated sequence of input commands (such as the commands relating to the FORCE-A20 and CPU-RESET signals 12 and 22). Thus, although variations in the embodiment of the present invention may not each realize all of the advantages of the invention, certain features may become more important than others in various applications. The invention, accordingly, should be understood to be limited only by the scope of the appended claims.

What is claimed is:

1. A method for filtering input commands directed to a controller operating using a series of software commands responsive to input commands, said controller accessed by a microprocessor, said input commands intended to direct said controller to produce system control signals in response to said input commands from said microprocessor, comprising the steps of:
monitoring signal lines coupled to output terminals of said microprocessor, said signal lines communicating input commands from the microprocessor;
processing a selected input command using a logic device; and
producing an output signal from said logic device corresponding to said selected input command, as said system control signal, and in replacement of said system control signal directed to be produced by said controller, after a shorter delay from the time said monitoring step detects said selected input command than the delay if said controller operated using a series of software commands responsive to said selected input command.

2. The method of claim 1, further comprising:
blocking a write command signal from being applied to said controller for said selected input command.

3. The method of claim 2, wherein said logic device has an input coupled to receive said write command signal, and has an output for presenting said write command signal to said controller; and
wherein said blocking step is performed by said logic device not presenting said write command signal to said controller responsive to receiving said selected input command.

4. The method of claim 1, wherein said logic device is a separate integrated circuit from said controller.

5. The method of claim 1, wherein said system control signal corresponds to an address bit masking signal.

6. The method of claim 1, wherein said system control signal corresponds to a microprocessor reset signal.

7. The method of claim 1, wherein said controller is of the 8042 type.

8. A method of controlling a computer system, said computer system comprising a microprocessor having real and protected mode operation capabilities and a controller for operating in a programmed manner according to input commands produced by the microprocessor, said microprocessor coupled to signal lines for communicating the input commands to the controller, said method comprising the steps of:
detecting a FORCE-A20 input command on the signal lines, said FORCE-A20 input command intended to direct the controller to produce a FORCE-A20 system control signal for use in masking address bit A20; and
responsive to said detecting step, producing the FORCE-A20 system control signal with circuitry coupled to the signal lines;
wherein the propagation delay of the circuitry in producing the FORCE-A20 system control signal responsive to said detecting step is shorter than the delay of the controller operating in the programmed manner to the FORCE-A20 input command.

9. The method of claim 8, further comprising:
blocking a write command signal from being applied to the controller responsive to said detecting step, so that said controller is rendered inoperable to produce the FORCE-A20 system control signal responsive to said FORCE-A20 input command.

10. The method of claim 9, wherein said circuitry has an input for receiving the write command signal, and has an output coupled to said controller for communicating the write command signal thereto; and
wherein said blocking step is performed by said circuitry.

11. The method of claim 8, wherein said circuitry is in a separate integrated circuit from that of said controller.

12. The method of claim 8, further comprising:
detecting a CPU-RESET input command on the signal lines, said CPU-RESET input command intended to direct the controller to produce a CPU-RESET system control signal for application to the microprocessor; and
responsive to said step of detecting the CPU-RESET input command, producing the CPU-RESET system control signal with the circuitry.

13. The method of claim 8, wherein the controller comprises a keyboard controller of the 8042 type.

14. A data processing system, comprising:
a microprocessor of a type having the capability of operating in real mode and in protected mode, said microprocessor coupled to an address bus including an A20 address line, said microprocessor having the functional capability of forcing the A20 address line to a logic level responsive to a FORCE-A20 signal;
a controller having inputs for receiving a set of input commands produced by said microprocessor intended to cause said controller to direct system operation in a programmed manner in response to said input commands, said set of input commands comprising a FORCE-A20 input command that is intended to generate the FORCE-A20 signal; and
circuitry, having inputs coupled to said microprocessor to receive input commands therefrom, for generating the FORCE-A20 signal responsive to receiving a FORCE-A20 input command from said microprocessor and in replacement of said controller generating the FORCE-A20 signal;
wherein said generating circuitry generates the FORCE-A20 signal responsive to the FORCE-A20 input command in a shorter time than the delay of said controller operating in the programmed manner responsive to the FORCE-A20 input command.

15. The system of claim 14, wherein said generating circuitry is located in a separate integrated circuit from that of said controller.

16. The system of claim 14, wherein said generating circuitry is also for blocking a write command signal from being applied to said controller for said FORCE-A20 input command.

17. The system of claim 16, wherein said generating circuitry has an input for receiving a write command signal, and has an output coupled to said controller for presenting the write command signal thereto.

18. The system of claim 14, wherein said microprocessor also has an input for receiving a CPU-RESET signal;
wherein said set of input commands further comprises a CPU-RESET input command that is intended to generate the CPU-RESET signal; and
wherein said generating circuitry is also for generating the CPU-RESET signal responsive to receiving the CPU-RESET input command from said microprocessor and in replacement of said controller generating the CPU-RESET signal.

19. The system of claim 18, wherein said generating circuitry comprises a programmable logic array.

20. The system of claim 18, wherein said generating circuitry comprises:
a first programmable logic array for generating the FORCE-A20 signal responsive to receiving a FORCE-A20 input command from said microprocessor; and
a second programmable logic array for generating the CPU-RESET signal responsive to receiving a CPU-RESET input command from said microprocessor.

21. A method of controlling a computer system, said computer system comprising a microprocessor and a controller for operating in a programmed manner according to input commands produced by the microprocessor, said microprocessor coupled to signal lines for communicating the input commands to the controller, said method comprising the steps of:
detecting a microprocessor reset input command on the signal lines, said microprocessor reset input command intended to direct the controller to produce a microprocessor reset system control signal for application to the microprocessor; and
responsive to said detecting step, producing the microprocessor reset system control signal with circuitry coupled to the signal lines and to the microprocessor;
wherein the propagation delay of the circuitry in producing the microprocessor reset system control signal responsive to said detecting step is shorter than the delay of the controller operating in the programmed manner to the microprocessor reset input command.

22. The method of claim 21, further comprising:
blocking a write command signal from being applied to the controller responsive to said detecting step, so that said controller is rendered inoperable to produce the microprocessor reset system control signal responsive to said microprocessor reset input command.

23. The method of claim 22, wherein said circuitry has an input for receiving the write command signal, and has an output coupled to said controller for communicating the write command signal thereto; and
wherein said blocking step is performed by said circuitry.

24. The method of claim 21, wherein said circuitry is in a separate integrated circuit from that of said controller.

25. The method of claim 21, wherein the controller comprises a keyboard controller of the 8042 type.

26. A data processing system, comprising:
a microprocessor having an input for receiving a microprocessor reset signal;
a controller having inputs for receiving a set of controller input commands produced by said microprocessor intended to cause said controller to direct system operation in a programmed manner in response to said controller input commands, said set of input commands comprising a microprocessor reset input command that is intended to generate the microprocessor reset signal;
circuitry, having inputs coupled to said microprocessor to receive input commands therefrom, for generating the microprocessor reset signal responsive to receiving a microprocessor reset input command from said microprocessor and in replacement of said controller generating the microprocessor reset signal;
wherein said generating circuitry generates the microprocessor reset signal responsive to the microprocessor reset input command in a shorter time than the delay of said controller operating in the programmed manner responsive to the microprocessor reset input command.

27. The system of claim 26, wherein said generating circuitry is located in a separate integrated circuit from that of said controller.

28. The system of claim 26, wherein said generating circuitry is also for blocking a write command signal from being applied to said controller for said microprocessor reset input command.

29. The system of claim 28, wherein said generating circuitry has an input for receiving a write command signal, and has an output coupled to said controller for presenting the write command signal thereto.

* * * * *